United States Patent Office
3,462,421
Patented Aug. 19, 1969

3,462,421
3-CARBALKOXY-METHYLENE-STEROIDS AND PROCESS FOR PREPARING THEM
Ulrich Stache, Hofheim, Taunus, Werner Fritsch, Neuenhain, Taunus, and Werner Haede and Gerhard Vogel, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Aug. 22, 1966, Ser. No. 573,838
Claims priority, application Germany, Aug. 21, 1965, F 46,951, F 46,952
Int. Cl. C07c *169/12, 169/24, 169/36*
U.S. Cl. 260—239.55                                23 Claims

ABSTRACT OF THE DISCLOSURE

3 - carbalkoxy - methylene-$\Delta^4$- and -$\Delta^{4,6}$-steroids of the pregnane, androstane, and oestrane series, having gestogenic activity. Method of making such steroids from corresponding 3-oxo-$\Delta^4$- or -$\Delta^{4,6}$-steroids and a carbalkoxymethyl dialkyl phosphonate.

It is known in the art to react saturated 3-oxo-steroid derivatives of the cholestane and androstane series with carbalkoxy-methyl-dialkylphosphonates in the presence of bases to obtain the corresponding 3-carbalkoxy-methylene-steroids (Bose et al., Tetrahedron Letters, 959 (1963); J. Org. Chem. 30, 505 (1965)).

Attempts to prepare 3-carbalkoxy-methylene-$\Delta^4$-steroid derivatives from the corresponding 3-oxo-$\Delta^4$-steroid derivatives failed (Bose et al., J. Org. Chem. 30, 505 (1965)).

The present invention provides 3-carbalkoxy-methylene-$\Delta^4$-(or -$\Delta^{4,6}$-)steroid derivatives and a process for preparing them. These new steroid derivatives are obtained by reacting 3-oxo-$\Delta^4$-steroids or 3-oxo-$\Delta^{4,6}$-steroids of the pregnane, androstane or oestrane series with carbalkoxymethyl-dialkyl-phosphonates in the presence of anhydrous bases and, if desired, subsequently esterifying any hydroxy groups present.

The process of the present invention is carried out in the presence of organic solvents. For preparing 3-carbalkoxy-methyl-$\Delta^4$-steroid derivatives it is advisable to use such solvents which show no prototropic behavior towards 3-oxo-$\Delta^4$-steroids in the presence of carbalkoxymethylphosphonates. According to the definition given in "Elektronentheorie der organischen Chemie" by J. W. Baker (Stuttgart 1960), pages 112–113, in a prototropic system the mobile hydrogen atom separates in the form of a proton. Hence, a prototropic system contains mobile hydrogen atoms. Therefore, solvents which contain mobile hydrogen atoms, for example, those containing alcoholic groups are less suitable in general. As solvents for reactions with $\Delta^4$-steroids, inert solvents such as ether, preferably diethyl ether, tetrahydrofurane, dioxane, glycol dimethyl ether, diethylene glycol dimethyl ether, or dimethyl sulfoxide, dimethylformamide or even aromatic or aliphatic hydrocarbons such as benzene, toluene, xylene or hexane are used.

If 3-oxo-$\Delta^{4,6}$-steroid derivatives are used as starting substances, alcohols also may be used as solvents, in addition to those already mentioned, preferably methanol, ethanol, tert. butanol or even mixtures of the mentioned solvents.

The reaction according to the process of the present invention is carried out in an anhydrous phase; as anhydrous bases, alkali metal hydrides or alkaline earth metal hydrides, for example, sodium hydride, alkali metal amides or alkaline earth metal amides, for example, sodium amide, as well as alkali metal triphenyl methanes such as trityl sodium are preferably used. If 3-oxo-$\Delta^{4,6}$-steroids are used as starting compounds, the process can also be carried out in the presence of alkali metal or alkaline earth metal alcoholates with anhydrous bases.

If 3-oxo-$\Delta^4$-steroids are used, the reaction according to the present invention may proceed according to the following reaction scheme:

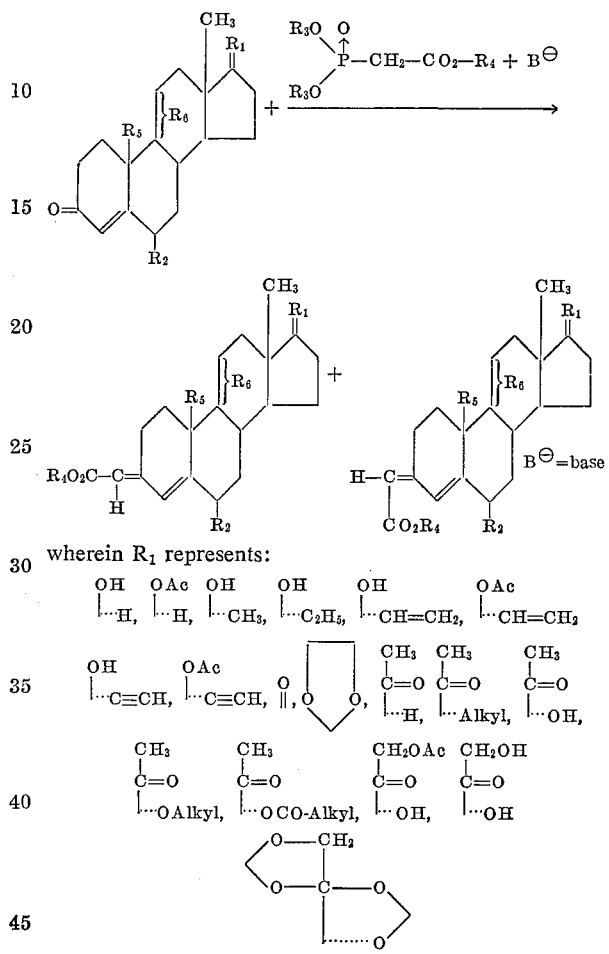

wherein $R_1$ represents:

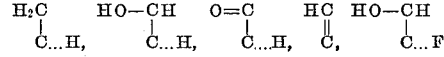

$R_2$ represents: —H, —$CH_3$, —F, —Cl, . . . . $CH_3$, . . . . F, . . . . Cl
$R_3$ represents: $CH_3$, $C_2H_5$
$R_4$ represents: a saturated or unsaturated aliphatic, cycloaliphatic or araliphatic radical containing 1–12 C-atoms
$R_5$ represents: $CH_3$ or H and
$R_6$ represents:

$H_2C$     HO—CH     O=C     HC     HO—CH
|            |            |         ||        |
C...H,      C...H,      C...H,     C,       C...F and ALK represents the radical $R_4$ A corresponding reaction scheme applies to the reaction of 3-oxo-$\Delta^{4,6}$-steroids which contain a further double linkage in 6-position.

The products obtained by the process of the present invention are generally obtained in the form of cis/trans mixtures with regard to the arrangement of the carbalkoxy group at the exocyclic 3-double linkage.

The course of the process of the present invention is surprising and represents an advance in the art. Thus, for example, it could not be expected that, in the case of $\Delta^4$-steroids which contain no double linkage in 6-position, the products of the invention are obtained in a high yield and purity but in general only under nonprototropic reaction conditions and that no side reactions occur. Furthermore, it is surprising that a 20-oxo function, which for example, is characteristic for all pregnene-20-one derivatives, also does not enter into reaction, neither in the case of $\Delta^4$- or $\Delta^{4,6}$-steroids nor if the process is carried out with a large excess of base and phosphonate and under severe reaction conditions. The same applies to the 17-oxo group of the androstane and oestrane series.

The 3-oxo-$\Delta^4$-steroids and 3-oxo-$\Delta^{4,6}$-steroids of the pregnane, androstane or oestrane series required as starting substances in the process of the present invention are prepared according to already known processes. The steroid molecule may be provided at other places also with functions which are inert toward the reaction partners, such as an alkyl group, for example, a 6- or 17α-alkyl group, an alkene group, for example, an isolated $\Delta^{9(11)}$-double bond, an exocyclic 16-methylene group or a 17α-vinyl group, an ethinyl group, for example, a 17α-ethinyl group, an ether group, for example, a 17α-alkoxy group, a hydroxy group, for example, a 17α-hydroxy group with or without an additional 21-hydroxy group, an ester group, for example, a 17α- or 21-acyloxy group, a halogen group, for example, a 6- or 9-halogen group, or an epoxide group, for example, a 6α, 7α-oxido group. 3-oxo-$\Delta^4$-6α, 7α-oxido-steroids can also be reacted under prototropic conditions to yield 3 - carbalkoxy - methylene-$\Delta^4$ - 6α,7α-oxido-steroids because the 3-carbalkoxy-methylene-$\Delta^4$-6α-7α-oxido system formed is not deconjugated.

As starting substances, the following $\Delta^4$-steroid derivatives may be used according to the invention:

$\Delta^4$-pregnene-3,20-dione,
17α-methyl-$\Delta^4$-pregnene-3,20-dione,
17α,6α-dimethyl-$\Delta^4$-pregnene-3,20-dione,
17α-hydroxy-$\Delta^4$-pregnene-3,20-dione,
17α-hydroxy-6α(or 6β)methyl-$\Delta^4$-pregnene-3,20-dione,
17α-hydroxy-6α (or 6β)-fluoro-$\Delta^4$-pregnene-3,20-dione,
17α-hydroxy-6α-(or 6β)-chloro-$\Delta^4$-pregnene-3,20-dione,
17α-hydroxy-6α,7α-oxido-$\Delta^4$-pregnene-3,20-dione and their 17α-acyloxy- and 16-methylene derivatives or their 17α-acyloxy-derivatives, $\Delta^4$-androstene-3,17-dione,
17-ethylene-dioxy-$\Delta^4$-androstene-3-one,
17β-hydroxy-$\Delta^4$-androstene-3-one,
17β-hydroxy-17α-methyl-$\Delta^4$-androstene-3-one,
17β-hydroxy-17α-ethyl-$\Delta^4$-androstene-3-one,
17β-hydroxy-17α-vinyl-$\Delta^4$-androstene-3-one,
17β-hydroxy-17α-ethinyl-$\Delta^4$-androstene-3-one,
17β-hydroxy-6α-methyl-17α-ethinyl-$\Delta^4$-androstene-3-one and their 17-acyloxy-, alkoxy- and 19-nor derivatives (=$\Delta^4$-oestrene series) and the acyloxy- and alkoxy-derivatives of the corresponding 19-nor compounds.

As $\Delta^{4,6}$-steroid derivatives there may be used, for example, $\Delta^{4,6}$-pregnadiene-3,20-dione,
17α-methyl-$\Delta^{4,6}$-pregnadiene-3,20-dione,
6α,17α-dimethyl-$\Delta^{4,6}$-pregnadiene-3,20-dione,
17α-hydroxy-$\Delta^{4,6}$-pregnadiene-3,20-dione,
17α-hydroxy-6-methyl-$\Delta^{4,6}$-pregnadiene-3,20-dione,
17α-hydroxy-6-fluoro-$\Delta^{4,6}$-pregnadiene-3,20-dione,
between $\lambda_{max}$=238 to 242 m$\mu$ disappears and that the
17α-hydroxy-6-bromo-$\Delta^{4,6}$-pregnadiene-3,20-dione and their 17α-acyloxy- and 16-methylene derivatives or their 17α-acyloxy derivatives.

As phosphonates, carbmethoxy-methyl- or carbethoxy-methyl-dimethyl phosphonate or carbmethoxy-methyl- or carbethoxy-methyl-diethyl phosphonate are preferably used.

For carrying out the process of the invention, the 3-oxo-$\Delta^4$-(or $\Delta^{4,6}$)-steroid derivatives in an inert organic solvent are added or dropwise added in form of a solution or suspension to a solution or suspension of 1 to 5 molar equivalents, preferably 2 molar equivalents, of an anhydrous base and of 1 to 5 molar equivalents, preferably 2 to 3 molar equivalents, of one of the above-specified phosphonates in a solvent, and then treated at a temperature in the range of 0° C. to (preferably) the boiling temperature of the solvent used. It is also possible to proceed in reversed order and to add the solution of the base to the solution or suspension of the steroid component and of the phosphonate. Finally, it is also possible first to introduce the steroid derivative and the base into the indicated solvent and then to add the solution of phosphonate.

The reaction time depends on the reaction conditions; however, it is preferred to carry out the reaction in 3-position in such a manner that after the reaction the reaction mixture can be allowed to stand for a prolonged period of time under the reaction conditions.

The best means for observing the progress of the reaction consists in ultraviolet measurements of samples taken out during the reaction; such measurements reveal when the 3-oxo-$\Delta^{4,6}$-chromophoric system disappears and when, instead thereof, the clearly bathochromically shifted absorption maximum of the 3-carbalkoxy-methylene-$\Delta^{4,6}$-chromophore appears. The course of the reaction can also be followed by observation of the different infrared spectra of the starting products and of the final products.

If 3-oxo-$\Delta^4$-steroids are used as starting substances, the course of the reaction can be observed by the fact that the characteristic absorption maximum of 3-oxo-$\Delta^4$-steroids between $\lambda_{max}$=238 to 242 m$\mu$ disappears and that the maximum in the range of 277 to 283 m$\mu$ which is characteristic for the 3-carbalkoxymethylene-$\Delta^4$-steroids appears.

The final products are isolated by generally known methods. As soon as the reaction is completed, the reaction mixture is poured into water, and the products which separate in crystalline or pseudocrystalline form are filtered off. Products which are isolated in form of an oil are extracted as usual with a suitable organic solvent. After washing with water and removal of the solvent, they are isolated in the form of oils, foams or also, after crystallization from a suitable solvent, in form of crystalline compounds. The products of the invention, which are obtained in the form of mixtures of cis/trans isomers, can be separated, if desired, by fractional crystallization or by chromatographic separation to obtain the pure cis or trans isomers. The products are obtained in yields of 80 to 100% of the theory.

The products of the present invention are distinguished by a favorable ratio of gestagenic activity to gonadotropin- or ovulation-inhibiting action. The products of the pregnane, oestrane and androstane series may be used in human therapy as hormonal preparations having gestagnetic activity for the oral treatment of endocrinal disorders as well as for influencing the fertility of women. The products can be administered in the form of tablets, dragés, solutions or suspensions, etc., if desired in admixture with pharmaceutically acceptable carriers, in doses ranging from 1 to 20 mg. In addition, they may also be used as intermediate products for the preparation of other valuable steroid derivatives.

The following examples illustrate the invention but they are not intended to limit it.

Example 1.—3-carbmethoxy-methylene-17β-hydroxy-17α-methyl-$\Delta^4$-androstene

A solution of 8 g. of carbmethoxy-methyl-diethyl phosphonate in 3 ccm. of absolute tetrahydrofurane is introduced dropwise, while stirring and cooling, into a suspension of 720 mg. of sodium hydride in 10 ccm. of absolute tetrahydrofurane. As soon as the evolution of $H_2$ ceases, the clear reaction solution is combined with a solution of 3.02 g. of 17-methyl-testosterone in 10 ccm. of absolute tetrahydrofurane. After stirring for 3 hours at 20° C. and boiling under reflux for another 3 hours, the reaction mixture is poured into water, a small amount of alcohol is added, whereupon a light oil separates which crystallizes upon prolonged standing. The crystalline product is filtered off, washed thoroughly with water and dried over $P_2O_5$ under reduced pressure. 3.1 g. of 3-carbmethoxy - methylene - 17β - hydroxy-17α-methyl-Δ⁴-androstene are obtained. Melting point: 124°–128° C. Ultraviolet spectrum: $\lambda_{max.}=280$ mμ, $\epsilon=25,600$. Characteristic infrared bands: 3400, 1715, 1620 cm.⁻¹.

Example 2.—3-carbmethoxy-methylene-17α-ethinyl-17β-hydroxy-Δ⁴-androstene

A solution of 5.3 g. of carbmethoxy-methyl-diethyl phosphonate in 2 ccm. of absolute tetrahydrofuran is introduced dropwise, while stirring and cooling, into a suspension of 480 mg. of sodium hydride in 7 ccm. of absolute tetrahydrofurane. After termination of the evolution of $H_2$, the reaction solution is combined with a solution of 2.08 g. of 17α-ethinyl-17β-hydroxy-Δ⁴-androstene-3-one in 50 ccm. of absolute tetrahydrofurane. After boiling for 5 hours under reflux, a sample taken from the reaction mixture shows that the ultraviolet maximum of the starting compound ($\lambda_{max.}=240$ mμ) has disappeared and instead of it the maximum of the compound desired ($\lambda_{max.}=240$ mμ) has appeared. The reaction mixture is then poured into a mixture of water and ethanol (ratio 9:1), whereupon a light oil precipitates which crystallizes upon standing. The finely crystalline precipitate is filtered off, washed with water and dried over $P_2O_5$ under reduced pressure. 2.2 g. of 3-carbmethoxy - methylene - 17α-ethinyl-17β-hydroxy-Δ⁴-androstene melting at 80–100° C. are obtained. Ultraviolet spectrum: $\lambda_{max.}=280$ mμ, $\epsilon=24,000$. Characteristic infrared bands: 3400, 3290, 2100, 1710, 1620 cm.⁻¹.

Example 3.—3-carbmethoxy-methylene-Δ⁴-pregnene-20-one

A solution of 3.1 g. of carbmethoxy-methyl-diethyl phosphonate in 1 ccm. of absolute tetrahydrofurane is introduced dropwise, while stirring and cooling, into a suspension of 300 mg. of sodium hydride (or 490 mg. of sodium amide) in 10 ccm. of absolute tetrahydrofurane. When the evolution of $H_2$ (or of $NH_3$) has ceased, a solution of 3.14 g. of Δ⁴-pregnene-3,20-dione in 10 ccm. of absolute tetrahydrofurane is added dropwise to the reaction solution. The whole is stirred for 4 hours at a bath temperature of 50 to 60° C. and then boiled for 2½ hours under reflux. The reaction mixture is then poured into water, whereupon a white oil separates. The oil is extracted with benzene, washed with water to neutrality and the benzene is removed by distillation. A light oil remains behind which crystallizes soon and which is dried under reduced pressure. 3.3 g. of crystallized 3-carbmethoxy-methylene-Δ⁴-pregnene-20-one are obtained. Ultraviolet spectrum: $\lambda_{max.}=280$ mμ, $\epsilon=23,500$. Characteristic infrared bands: 1715, 1695, 1630 cm.⁻¹ (measured as oil). Melting point: 111–113° C. (indefinite, recrystallized from ether). Melting point after renewed recrystallization from ether: 126–128° C.

A reaction mixture prepared in analogous manner is allowed, after addition of the progesterone, to stand for 5 days at 20° C., and is then worked up as described above. 3.1 g. of carbmethoxy-methylene-Δ⁴-pregnene-20-one showing the same spectral data as above are obtained.

Example 4.—3-carbmethoxy-methylene-6α-methyl-17α-acetoxy-Δ⁴-pregnene-20-one

A solution of 1.25 g. of carbmethoxy-methyl-diethyl phosphonate in 1 ccm. of absolute tetrahydrofurane is introduced dropwise, while stirring and cooling, into a suspension of 120 mg. of sodium hydride in 3 ccm. of absolute tetrahydrofurane. After termination of the evolution of $H_2$, the reaction mixture is combined with a suspension of 960 mg. of 6α-methyl-17α-acetoxy-Δ⁴-pregnene-3,20-dione in 8 ccm. of absolute tetrahydrofurane. Directly following heating up of the reaction mixture, the solid components of the reaction mixture dissolve. The whole is then boiled for 6¼ hours, while stirring, under reflux and the clear reaction solution is poured into water, whereupon a solid light oil separates. The precipitate is filtered off, washed thoroughly with water, dissolved in a small amount of benzene and the benzene is removed by distillation under reduced pressure. 1 g. of 3-carbmethoxy - methylene - 6α - methyl-17α-acetoxy-Δ⁴-pregnene-20-one is obtained in the form of a light pseudocrystalline foam. Melting point: 90–120° C. Ultraviolet spectrum: $\lambda_{max.}=279–280$ mμ, $\epsilon=24,400$. Characteristic infrared bands: 1740, 1720, 1630, 1250 cm.⁻¹.

Example 5.—3-carbmethoxy-methylene-6α-methyl-17α-hydroxy-Δ⁴-pregnene-20-one 3.5 g. of carbmethoxy-methyl-diethyl phosphonate are added dropwise to a suspension of 360 mg. of sodium hydride in 8 ccm. of absolute tetrahydrofurane. After termination of the evolution of $H_2$, a suspension of 1.7 g. of 6α-methyl-17α-hydroxy-Δ⁴-pregnene-3,20-dione in 12 ccm. of absolute tetrahydrofurane is added. The whole is boiled for 3 hours under reflux and the reaction mixture is then poured into water, whereupon an oil separates. The oil is extracted with methylene chloride, washed with water and the solvent is removed by distillation under reduced pressure. A pseudocrystalline foam remains behind which has no definite melting point. The foam is digested with hexane and filtered off. 1.5 g. of solid amorphous 3-carbmethoxy - methylene - 6α - methyl - 17α - hydroxy-Δ⁴-pregnene-20-one are obtained. Ultraviolet spectrum: $\lambda_{max.}=279$ mμ, $\epsilon=20,100$. Characteristic infrared bands: 3450, 1740, 1710, 1620 cm.⁻¹.

Example 6.—3-carbmethoxy-methylene-6α,7α-oxido-17α-acetoxy-Δ⁴-pregnene-20-one 2.5 g. of carbmethoxy-methyl-diethyl-phosphonate are added dropwise to a suspension of 240 mg. of sodium hydride in 6 ccm. of absolute tetrahydrofurane. After termination of the evolution of $H_2$, the reaction mixture is combined with a suspension of 1.93 g. of 6α,7α-oxido-17α-acetoxy-Δ⁴-pregnene-3,20-dione in 25 ccm. of absolute tetrahydrofurane. The reaction mixture is then boiled for 6 hours under reflux and poured into water, whereupon an oil separates. The oil is extracted with benzene, washed thoroughly with water and the benzene is removed by distillation under reduced pressure. 1.9 g. of 3-carbmethoxy - methylene - 6α,7α - oxido - 17α - acetoxy - Δ⁴-pregnene-20-one are obtained in the form of a light oil which crystallizes upon addition of ether. Melting point: 160–170° C. Ultraviolet spectrum $\lambda_{max.}=278$ mμ, $\epsilon=24,800$. Characteristic infrared bands: 1740, 1720, 1630, 1250 cm.⁻¹.

Example 7.—3-carbmethoxy-methylene-6α,7α-oxido-17α-acetoxy-Δ⁴-pregnene-20-one

A solution of 200 mg. of sodium in 6 ccm. of absolute ethanol is introduced dropwise, while stirring, into a solution of 1.5 g. of 6α,7α-oxido-17α-acetoxy-Δ⁴-pregnene-3,20-dione and 3.4 g. of carbmethoxy-methyl-diethyl phosphonate in 12 ccm. of absolute tetrahydrofurane and 10 ccm. of absolute ethanol. The reaction mixture is stirred for 3 hours at a temperature in the range of 50 to 60° C.; it is then poured into water, the crystalline product that has precipitated is filtered off and washed thoroughly with water. 1.53 g. of 3-carbmethoxy-methylene-6α,7α-oxido-17α-acetoxy-Δ⁴-pregnene-20-one showing the same ultraviolet and infrared data as the product of Example 6 are obtained.

Example 8.—3-carbethoxy-methylene-6α-methyl-17α-acetoxy-Δ⁴-pregnene-20-one 3.5 g. carbethoxy-methyl-diethyl phosphonate are added dropwise, while stirring and cooling, to a suspension of 290 mg. of sodium hydride in 80 ccm. of absolute tetrahydrofurane. After termination of the evolution of $H_2$, the reaction solution is combined with a suspension of 2.3 g. of 6α-methyl-17α-acetoxy-$\Delta^4$-prognene-3,20-dione in 20 ccm. of absolute tetrahydrofurane. The reaction mixture is then boiled for 6 hours under reflux and poured into a mixture of water and ethanol (ratio 9:1), whereupon a light viscous oil precipitates. The oil is filtered off, taken up in benzene, the benzene phase is washed with water and the benzene is distilled off. The oil that remains behind crystallizes upon addition of ether. After filtration, there are obtained 2 g. of crystalline 3-carbethoxy-methylene-6α-methyl-17α-acetoxy-$\Delta^4$-pregnene-20-one. Ultraviolet spectrum: $\lambda_{max.}$=280 m$\mu$, $\epsilon$=23,600. Melting range: 130–180° C. Characteristic infrared bands: 1740, 1710, 1630, 1250 cm.$^{-1}$.

A reaction mixture prepared in analogous manner but with 3.3 g. of carbethoxy-methyl-dimethyl phosphonate instead of carbethoxy-methyl-diethyl phosphonate leads to an identical product having the same ultraviolet and infrared data.

Example 9.—3-carbmethoxy-methylene-$\Delta^4$-androstene-17-one 1.55 g. of carbmethoxy-methyl-diethyl phosphonate are added dropwise to a suspension of 150 mg. of sodium hydride in 5 ccm. of absolute tetrahydrofurane. After termination of the evolution of $H_2$, a solution of 1.43 g. of $\Delta^4$-androstene-3,17-dione in 4 ccm. of absolute tetrahydrofurane is added dropwise. The whole is boiled under reflux until samples taken from the reaction mixture show no increase in the extinction of the ultraviolet absorption maximum at $\lambda_{max.}$=280 m$\mu$ (about 10–16 hours under reflux). The reaction mixture is then poured into water, shaken with ether, washed with water and the ether is removed by distillation. 1.5 g. of 3-carbmethoxy-methylene-$\Delta^4$-androstene-17-one in the form of a clear transparent oil are obtained. Ultraviolet spectrum: $\lambda_{max.}$=280 m$\mu$, $\epsilon$=22,100. Characteristic infrared bands: 1740, 1715, 1625 cm.$^{-1}$.

Example 10.—3-carbmethoxy-methylene-17α-ethinyl-17β-acetoxy-$\Delta^4$-androstene A solution of 4 g. of carbmethoxy-methyl-diethyl-phosphonate is added dropwise, while stirring and cooling, to a suspension of 371 mg. of sodium hydride in 9 ccm. of absolution tetrahydrofurane. After termination of the evolution of $H_2$, the clear reaction solution is combined with a solution or suspension of 2.75 g. of 17α-ethinyl-17β-acetoxy-$\Delta$4-androstene-3-one in 15 ccm. of absolute tetrahydrofurane. After boiling for 6 hours under reflux, the reation mixture is poured into water, the crystalline product that has precipitated is filtered off, washed with water and dried over $P_2O_5$ under reduced pressure. 2.8 g. of crystalline 3-carbmethoxy-methyene-17α-ethinyl-17β-acetoxy-$\Delta^4$-androstene melting at 180–220° C. are obtained. Ultraviolet spectrum: $\lambda_{max.}$=280 m$\mu$, $\epsilon$=24,500. Infrared bands: 3300, 2100, 1710–1740, 1620, 1250 cm.$^{-1}$.

Example 11.—3-carbmethoxy-methylene-17α-acetoxy-$\Delta^4$-pregnene-20-one

An ylide solution is prepared as described in Example 10 from 700 mg. of sodium hydride and 7.5 g. of carbmethoxy-methyl-diethyl phosphonate in 15 ccm. of absolute tetrahydrofurane. After addition of 5 g. of 17α-acetoxy-progesterone in 40 ccm. of absolute tetrahydrofurane, the reaction mixture is boiled for 6 hours under reflux. It is then poured into water, the crystalline product that has precipitated is filtered off, washed with water and dried. 5.2 g. of 3-carbmethoxy-methylene-17α-acetoxy-$\Delta^4$-pregnene-20-one melting at 107–115° C. are obtained. Ultraviolet spectrum: 280–281 m$\mu$, $\epsilon$=23,100. Infrared bands: 1710, 1740, 1620, 1250 cm.$^{-1}$.

Example 12.—3-carbmethoxy-methylene-17β-hydroxy-$\Delta^4$-oestrene

A solution or suspension of 2.99 g. of 19-nor-testosterone in 50 ccm. of absolute tetrahydrofurane is added to an ylide solution prepared as described in Example 10 from 640 mg. of sodium hydride and 7 g. of carbmethoxy-methyl-diethyl phosphonate in 10 ccm. of absolute tetrahydrofurane. The reaction mixture is boiled for 7 hours under reflux, poured into water, the crystalline product that has precipitated is filtered off, washed and dried. 2.9 g. of 3-carbmethoxy-methylene-17β-hydroxy-$\Delta^4$-oestrene melting at 74–76° C. are obtained. Ultraviolet spectrum: 279–280 m$\mu$, $\epsilon$=22,200. Infrared bands: 3440, 1735, 1710, 1620 cm.$^{-1}$.

Example 13.—3-carbmethoxy-methylene-17α-ethinyl-17β-hydroxy-$\Delta^4$-oestrene

A solution or suspension of 1.4 g. of 19-nor-17-ethinyl-testosterone in 40 ccm. of absolute tetrahydrofurane is added to an ylide solution prepared as described in Example 10 from 325 mg. of sodium hydride and 3.6 g. of carbmethoxy-methyl-diethyl-phosphonate in 5 ccm. of absolute tetrahydrofurane. The reaction mixture is boiled for 6 hours with exclusion of moisture, poured into water, the crystalline product that has precipitated is filtered off, washed with water and dried. 1.5 g. of 3-carbmethoxy-methylene - 17α - ethinyl - 17β-hydroxy-$\Delta^4$-oestrene melting at 75–78° C. are obtained. Ultraviolet spectrum: 280 m$\mu$, $\epsilon$=22,400. Infrared bands: 3450, 3300, 2100, 1710, 1625 cm.$^{-1}$.

Example 14.—3-carbmethoxy-methylene-17α-methyl-17β-hydroxy-$\Delta^4$-oestrene

A solution of 3 g. of 17α - methyl - 17β - hydroxy - $\Delta^4$-oestrene-3-one in 12 ccm. of absolute tetrahydrofurane is added to an ylide solution prepared from 720 mg. of sodium hydride and 8 g. of carbmethoxy-methyl-diethylphosphonate in 13 ccm. of absolute tetrahydrofurane. After stirring for 3 hours at a temperature in the range of 50 to 60° C., the reaction mixture is poured into water and extracted with methylene chloride, the organic phase is washed with water, dried and the organic solvents are removed by distillation, at last under a reduced pressure of 0.01 mm. Hg. 3.0 g. of 3-carbmethoxy-methylene-17α-methyl-17β-hydroxy-$\Delta^4$-oestrene are obtained in the form of a light clear oil. Ultraviolet spectrum: 280 m$\mu$, $\epsilon$=21,700. Infrared bands: 3430, 1710, 1620 cm.$^{-1}$ (measured as oil).

Example 15.—3-carbethoxy-methylene-17α-methyl-17β-acetoxy-$\Delta^4$-androstene

A solution or suspension of 1.45 g. of 17α-methyl-testosterone acetate in 8 ccm. of absolute tetrahydrofurane is added to an ylide solution prepared as described in Example 10 from 200 mg. of sodium hydride and 2.4 g. of carbethoxy-methyl-diethyl phosphonate in 5 ccm. of absolute tetrahydrofurane, and the reaction mixture is boiled for 6 hours under reflux. It is then poured into water, the crystalline product that has precipitated is filtered off, washed with water and dried. 1.45 g. of 3 - carbethoxy - methylene - 17α - methyl - 17β - acetoxy-$\Delta^4$-androstene melting at 68–70° C. is obtained. Ultraviolet spectrum: $\lambda_{max.}$=280 m$\mu$, $\epsilon$=24,000. Infrared bands: 1730, 1710, 1625, 1260 cm.$^{-1}$.

Example 16.—3-carbmethoxy-methylene-7α,17α-dimethyl-17β-hydroxy-$\Delta^4$-androstene A solution or suspension of 4 g. of 7α,17α-dimethyl-17β-hydroxy-$\Delta^4$-androstene-3-one in 12 ccm. of absolute tetrahydrofurane is added to an ylide solution prepared as described in Example 10 from 960 mg. of sodium hydride and 11 g. of carbmethoxy-methyl-diethyl phosphonate in 13 ccm. of absolute tetrahydrofurane, and the reaction mixture is boiled for 6 hours under reflux. After a further treatment in a manner analogous to that described in Example 10, 3.9 g. of crystalline 3-carbmethoxy-methylene-7α,17α-dimethyl-17β-hydroxy-Δ⁴ - androstene melting at 68–72° C. are obtained. Ultraviolet spectrum: 280–281 mμ. ε=22,600. Infrared bands: 3440, 1710, 1620 cm.⁻¹.

Example 17.—3-carbmethoxy-methylene-7α,17α-dimethyl-17β-acetoxy-Δ⁴-androstene

A solution or suspension of 1.5 g. of 7α,17α-dimethyl-17β-acetoxy-Δ⁴-androstene-3-one in 8 ccm. of absolute tetrahydrofurane is added to an ylide solution prepared as described in Example 10 from 205 mg. of sodium hydride and 2.2 g. of carbmethoxy-methyl-diethyl phosphonate in 4 ccm. of absolute tetrahydrofurane, and the reaction mixture is then boiled for 6 hours under reflux. After further treatment according to Example 10, 1.6 g. of 3 - carbmethoxy - methylene - 7α,17α-dimethyl-17β-acetoxy-Δ⁴-androstene melting at 172–180° C. are obtained. Ultraviolet spectrum: $\lambda_{max.}$=280–281 mμ, ε=24,100. Infrared bands: 1730, 1710, 1620, 1260 cm.⁻¹.

Example 18.—3-carbethoxy-methylene-7α,17α-dimethyl-17β-acetoxy-Δ⁴-androstene

A reaction mixture, prepared as described in Example 17 but with 2.4 g. of carbethoxy-methyl-diethyl phosphonate instead of carbmethoxy-methyl-diethyl phosphonate, after the usual working up yields 1.6 g. of 3-carbethoxy-methylene-7α,17α-dimethyl-17β-acetoxy - Δ⁴ - androstene melting at 125–135° C. Ultraviolet spectrum: $\lambda_{max.}$=280 mμ, ε=22,300. Infrared bands: 1730, 1710, 1620, 1260 cm.⁻¹.

Example 19.—3-carbmethoxy-methylene-17α-acetoxy-Δ⁴,⁶-pregnadiene-20-one 1.25 g. of carbmethoxy-methyl-diethyl phosphonate are added dropwise, while stirring and cooling, to a suspension of 120 mg. of sodium hydride in 4 ccm. of absolute tetrahydrofurane. After termination of the evolution of H₂, the clear solution is combined with a suspension of 920 mg. of 17α-acetoxy-Δ⁴,⁶-pregnadiene-3,20-dione in 8 ccm. of absolute tetrahydrofurane. The reaction mixture is heated to the boiling temperature, whereby the suspended components dissolve, and then boiled for 6 hours under reflux. The reaction mixture is poured into a mixture of water and ethanol (ratio of 9:1), whereupon an oil first separates and soon crystallizes. The crystalline product is filtered off, washed thoroughly with water and dried under reduced pressure over P₂O₅. 910 mg. of crystalline 3 - carbmethoxy - methylene-17α-acetoxy-Δ⁴,⁶-pregnadiene-20-one melting at 110–170° C. are obtained; recrystallization from methanol gives a pure isomer melting at 233–236° C. Ultraviolet spectrum: $\lambda_{max.}$=313 mμ, ε=36,300, shoulder at 316 mμ. Characteristic infrared bands: 1740, 1710, 1600, 1250 cm.⁻¹.

Example 20.—3-carbmethoxy-methylene-6-chloro-17α-acetoxy-Δ⁴,⁶-pregnadiene-20-one 1 g. of carbmethoxy-methyl-diethyl phosphonate is added dropwise, while stirring and cooling, to a suspension of 96 mg. of sodium hydride in 4 ccm. of absolute tetrahydrofurane. After termination of the evolution of H₂, the reaction solution is combined with a solution of 810 mg. of 6-chloro-17α-acetoxy-Δ⁴,⁶-pregnadiene-3,20-dione in 6 ccm. of absolute tetrahydrofurane. After boiling for 7 hours under reflux, the reaction solution is poured into a mixture of water and ethanol (ratio 9:1), the crystalline product that has precipitated is filtered off, washed thoroughly with water and dried under reduced pressure over P₂O₅. 830 mg. of 3-carbmethoxy-methylene-6 - chloro-17α-acetoxy-Δ⁴,⁶-pregnadiene-20-one melting at 80–120° C. are obtained, which after several recrystallizations from a mixture of acetone and methanol, yields a pure isomer melting at 217–220° C. Ultraviolet spectrum: $\lambda_{max.}$=306–307 mμ, ε=36,900, shoulder at 314 mμ. Characteristic infrared bands: 1740, 1710, 1600, 1260 cm.⁻¹.

Example 21.—3-carbmethoxy-methylene-6-methyl-17α-acetoxy-Δ⁴,⁶-pregnadiene-20-one 3.3 g. of carbmethoxy-methyl-diethyl phosphonate are added dropwise, while stirring and cooling, to a suspension of 290 mg. of sodium hydride in 8 ccm. of absolute tetrahydrofurane. After termination of the evolution of H₂, the reaction solution is combined with a solution of 2.3 g. of 6-methyl-17α-acetoxy-Δ⁴,⁶-pregnadiene-3,20-dione in 20 ccm. of absolute tetrahydrofurane and the reaction mixture is boiled for 9 hours under reflux. It is then poured into a mixture of water and ethanol (ratio 9:1), the rubber-like oil that has precipitated is filtered off, dissolved in a few ccm. of benzene, the benzene extract is washed with water and the benzene is removed by distillation, at last under reduced pressure. 2.4 g. of 3 - carbmethoxy - methylene-6-methyl-17α-acetoxy-Δ⁴,⁶-pregnadiene-20-one in the form of a light solid foam are obtained. Melting point 90–110° C. After recrystallisation from methanol the product melts at 170–174° C. Ultraviolet spectrum: $\lambda_{max.}$=316–317 mμ, ε=34,900, shoulder at 311 mμ. Characteristic infrared bands: 1740, 1710, 1600, 1260 cm.⁻¹.

Example 22.—3-carbmethoxy-methylene-Δ⁴,⁶-pregnadiene-20-one

A solution of 1.05 g. of Δ⁴,⁶-pregnadiene-3,20-dione and 3.5 g. of carbmethoxy-methyl-diethyl phosphonate in 16 ccm. of absolute dimethylformamide is combined with a solution of 338 mg. of sodium in 6.5 ccm. of absolute ethanol and the whole is heated for 3 hours on a boiling water bath with exclusion of moisture. The mixture is poured into water, extracted with ether, the ether solution is washed with water to neutrality and the solvents are removed, at last under strongly reduced pressure. 1 g. of carbmethoxy-methylene-Δ⁴,⁶-pregnadiene-20-one is obtained in the form of a yellowish oily crude product. Ultraviolet spectrum: $\lambda_{max.}$=314 mμ, ε=21,000. Characteristic infrared bands: 1735, 1705, 1595 cm.⁻¹.

The infrared spectra were taken, unless stated otherwise, in KBr, the ultraviolet spectra in methanol. The melting behavior of the products was determined on a Kofler melting block. The melting points of the cis/trans isomer mixtures are not characteristic, in contradistinction to their ultraviolet and infrared values.

We claim:
1. 3-carbalkoxy-methylene-Δ⁴-steroids of the general formula

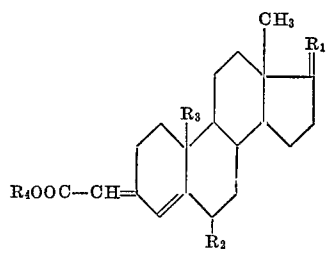

wherein R₁ means

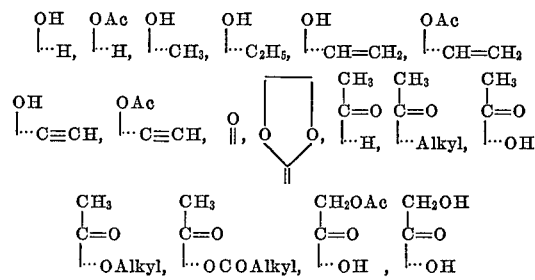

or

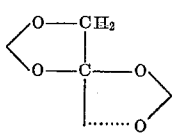

$R_2$ means —H, —CH$_3$, —F, —Cl, . . . . CH$_3$, . . . . F, or . . . . Cl; $R_3$ means methyl or hydrogen; and $R_4$ means methyl or ethyl.

2. 3-carbalkoxy-methylene-Δ$^{4,6}$-steroids of the general formula

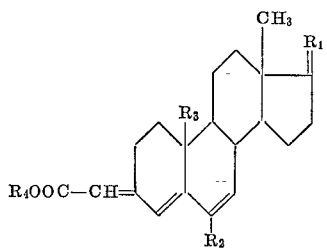

wherein $R_1$, $R_2$, $R_3$ and $R_4$ have the meanings given in claim 1.

3. 3 - carbmethoxy-methylene-17β-hydroxy-17α-methyl-Δ$^4$-androstene.

4. 3 - carbmethoxy - methylene - 17α - ethinyl-17β-hydroxy-Δ$^4$-androstene.

5. 3-carbmethoxy-methylene-Δ$^4$-pregnene-20-one.

6. 3 - carbmethoxy - methylene-6α-methyl-17α-acetoxy-Δ$^4$-pregnene-20-one.

7. 3 - carbmethoxy-methylene-6α-methyl-17α-hydroxy-Δ$^4$-pregnene-20-one.

8. 3 - carbmethoxy-methylene-6α,7α-oxido-17α-acetoxy-Δ$^4$-pregnene-20-one.

9. 3 - carbethoxy-methylene-6α-methyl-17α-acetoxy-Δ$^4$-pregnene-20-one.

10. 3-carbmethoxy-methylene-Δ$^4$-androstene-17-one.

11. 3 - carbmethoxy - methylene-17α-ethinyl-17β-acetoxy-Δ$^4$-androstene.

12. 3 - carbmethoxy - methylene-17α-acetoxy-Δ$^4$-pregnene-20-one.

13. 3-carbmethoxy-methylene-17β-hydroxy-Δ$^4$-oestrene.

14. 3 - carbmethoxy - methylene - 17α-ethinyl-17β-hydroxy-Δ$^4$-oestrene.

15. 3 - carbmethoxy - methylene-17α-methyl-17β-hydroxy-Δ$^4$-oestrene.

16. 3 - carbethoxy-methylene-17α-methyl-17β-acetoxy-Δ$^4$-androstene.

17. 3 - carbmethoxy - methylene-7α,17α-dimethyl-17β-hydroxy-Δ$^4$-androstene.

18. 3 - carbmethoxy - methylene-7α,17α-dimethyl-17β-acetoxy-Δ$^4$-androstene.

19. 3 - carbethoxy - methylene-7α,17α-dimethyl-17β-acetoxy-Δ$^4$-androstene.

20. 3 - carbmethoxy - methylene-17α-acetoxy-Δ$^{4,6}$-pregnadiene-20-one.

21. 3 - carbmethoxy - methylene-6-chloro-17α-acetoxy-Δ$^{4,6}$-pregnadiene-20-one.

22. 3 - carbmethoxy - methylene-6-methyl-17α-acetoxy-Δ$^{4,6}$-pregnadiene-20-one.

23. 3-carbmethoxy-methylene-Δ$^{4,6}$-pregnadiene-20-one.

References Cited

UNITED STATES PATENTS 3,248,392   4/1966   Evans _____ 260—239.57

OTHER REFERENCES

Bose et al., Tetrahedron Letters No. 15 (1963), pp. 959–963.

LEWIS GOTTS, Primary Examiner

ETHEL G. LOVE, Assistant Examiner

U.S. Cl. X.R.

260—397.1, 999